(12) United States Patent
MacDonald et al.

(10) Patent No.: US 12,098,676 B1
(45) Date of Patent: Sep. 24, 2024

(54) HEAT EXCHANGER BYPASS EJECTOR

(71) Applicant: RTX CORPORATION, Farmington, CT (US)

(72) Inventors: Malcolm P. MacDonald, Bloomfield, CT (US); Michael K. Ikeda, West Hartford, CT (US); Stephen H. Taylor, East Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/238,669

(22) Filed: Aug. 28, 2023

(51) Int. Cl.
| | |
|---|---|
| *F02C 6/20* | (2006.01) |
| *F02C 3/06* | (2006.01) |
| *F02C 7/141* | (2006.01) |
| *F02C 9/18* | (2006.01) |

(52) U.S. Cl.
CPC ............. *F02C 7/141* (2013.01); *F02C 3/06* (2013.01); *F02C 6/206* (2013.01); *F02C 9/18* (2013.01)

(58) Field of Classification Search
CPC ...... F02C 1/06; F02C 1/08; F02C 1/10; F02C 3/32; F02C 6/08; F02C 3/30
See application file for complete search history.

(56) References Cited

U.S. PATENT DOCUMENTS

| | | | | |
|---|---|---|---|---|
| 5,003,782 | A * | 4/1991 | Kucerija | F02C 3/32 |
| | | | | 60/648 |
| 9,003,762 | B2 * | 4/2015 | Scipio | F02K 1/822 |
| | | | | 60/39.5 |
| 10,576,485 | B2 * | 3/2020 | Jeong | F25B 41/00 |
| 11,428,162 | B2 * | 8/2022 | Staubach | F01K 23/02 |
| 2016/0273409 | A1 * | 9/2016 | Ekanayake | F02C 3/04 |
| 2017/0268423 | A1 * | 9/2017 | Schwarz | H02K 7/1823 |
| 2021/0222618 | A1 * | 7/2021 | Staubach | F01K 23/02 |
| 2022/0252011 | A1 * | 8/2022 | Rambo | F02C 6/08 |
| 2022/0381181 | A1 * | 12/2022 | Briley | F04F 5/48 |

* cited by examiner

*Primary Examiner* — Thuyhang N Nguyen

(74) *Attorney, Agent, or Firm* — Carlson, Gaskey & Olds, P.C.

(57) ABSTRACT

An aircraft propulsion system includes a core engine for generating an exhaust gas flow that is expanded through a turbine to generate shaft power. A heat exchanger is in communication with a partial portion of the exhaust gas flow and an exit flow is emitted from the heat exchanger. An ejector is configured to increase a pressure of the exit flow with a motive flow taken from the core flow path.

20 Claims, 3 Drawing Sheets

HEAT EXCHANGER BYPASS EJECTOR

TECHNICAL FIELD

The present disclosure relates generally to an aircraft propulsion system that includes an ejector for increasing flow pressures of exhaust flows exiting a heat exchanger.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate an exhaust gas flow. Improvements to conventional turbine engine architectures may include heat exchangers disposed in a core flow path. Heat exchangers impact exhaust gas flows, which generate a portion of engine thrust. Heat exchangers are a necessary component for improvements to engine architectures but present challenges to realization of improved engine efficiencies.

SUMMARY

An aircraft propulsion system according to an exemplary embodiment of this disclosure includes, among other possible things, a core engine where an inlet flow is communicated along a core flow path and is compressed, mixed with fuel, and ignited to generate an exhaust gas flow that is expanded through a turbine to generate shaft power. A heat exchanger is in communication with a partial portion of the exhaust gas flow, an exit flow is emitted from the heat exchanger. An ejector is configured to increase a pressure of the exit flow with a motive flow taken from the core flow path. A nozzle receives the exhaust gas flow and an emitted flow from the ejector.

In a further embodiment of the foregoing aircraft propulsion system, the motive flow is taken from a compressor section within the core flow path.

In a further embodiment of any of the foregoing aircraft propulsion systems, a location within the core flow path from which the motive flow is taken varies based on operating conditions.

In a further embodiment of any of the foregoing aircraft propulsion systems, the motive flow is further pressurized by a booster compressor.

In a further embodiment of any of the foregoing aircraft propulsion systems, the booster compressor is selectively driven by an electric motor.

In a further embodiment of any of the foregoing, the aircraft propulsion system further includes a bottoming cycle that includes a first heat transfer medium that is in thermal communication with the partial portion of the exhaust gas flow within the heat exchanger.

In a further embodiment of any of the foregoing aircraft propulsion systems, the bottoming cycle includes a turbine that is coupled to a compressor, and the first heat transfer medium expands through the turbine to drive the compressor.

In a further embodiment of any of the foregoing aircraft propulsion systems, the bottom cycle includes a recuperator heat exchanger where the first heat transfer medium is in thermal communication with a second heat transfer medium that is exhausted from the compressor and a cold sink heat exchanger where the second heat transfer medium is cooled by communication with a cold sink.

In a further embodiment of any of the foregoing aircraft propulsion systems, an area ratio between an inlet throat area and a nozzle throat area of the ejector is between 10.0 and 9.0.

In a further embodiment of any of the foregoing aircraft propulsion systems, an area ratio between an exit area and a throat area of a motive nozzle of the ejector is between 0.25 and 0.75.

An aircraft propulsion system according to another exemplary embodiment of this disclosure includes, among other possible things, a propulsor for generating a propulsive thrust and a compressor section where an inlet airflow is compressed, the compressor section includes a low pressure compressor and a high pressure compressor, a combustor section where the compressed inlet airflow is mixed with fuel and ignited to generate an exhaust gas flow, a turbine section through which the exhaust gas flow expands to generate a mechanical power output for driving the propulsor and the compressor section, the turbine section includes a high pressure compressor and a low pressure compressor. A heat exchanger is in communication with a partial portion of the exhaust gas flow, an exit flow is emitted from the heat exchanger. An ejector is configured to increase a pressure of the exit flow with a motive flow taken from the compressor section, and a nozzle receives the exhaust gas flow and an emitted flow from the ejector.

In a further embodiment of the foregoing aircraft propulsion system, the motive flow is taken from a compressor section.

In a further embodiment of any of the foregoing aircraft propulsion systems, a location within the compressor section from which the motive flow is taken varies based on operating conditions.

In a further embodiment of any of the foregoing, the aircraft propulsion system includes an electrically driven booster compressor that further pressurizes the motive flow taken from the compressor section.

In a further embodiment of any of the foregoing, the aircraft propulsion system further includes a bottoming cycle that includes a first heat transfer medium that is in thermal communication with the partial portion of the exhaust gas flow within the heat exchanger.

In a further embodiment of any of the foregoing aircraft propulsion systems, an area ratio between an inlet throat area and a nozzle throat area of the ejector is between 10.0 and 9.0.

In a further embodiment of any of the foregoing, the aircraft propulsion system includes a controller that is programed to operate a control device to vary the motive flow to the ejector based on engine operating conditions.

A method of operating a gas turbine engine according to another exemplary embodiment of this disclosure includes, among other possible things, generating an exhaust gas flow by igniting a mixture of compressed inlet air and fuel, communicating a portion of the exhaust gas flow through a heat exchanger for communicating thermal energy into another flow, increasing a pressure of an exit flow from the heat exchanger with a motive flow in an ejector, and communicating a combined exit flow and motive flow through an exhaust nozzle.

In a further embodiment of the foregoing, the method further includes recovering a portion of thermal energy from the exhaust gas flow with a bottoming cycle by transferring thermal energy to a first heat transfer medium within the heat exchanger.

In a further embodiment of any of the foregoing, the method further includes tapping the motive flow from a compressor section of the gas turbine engine.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
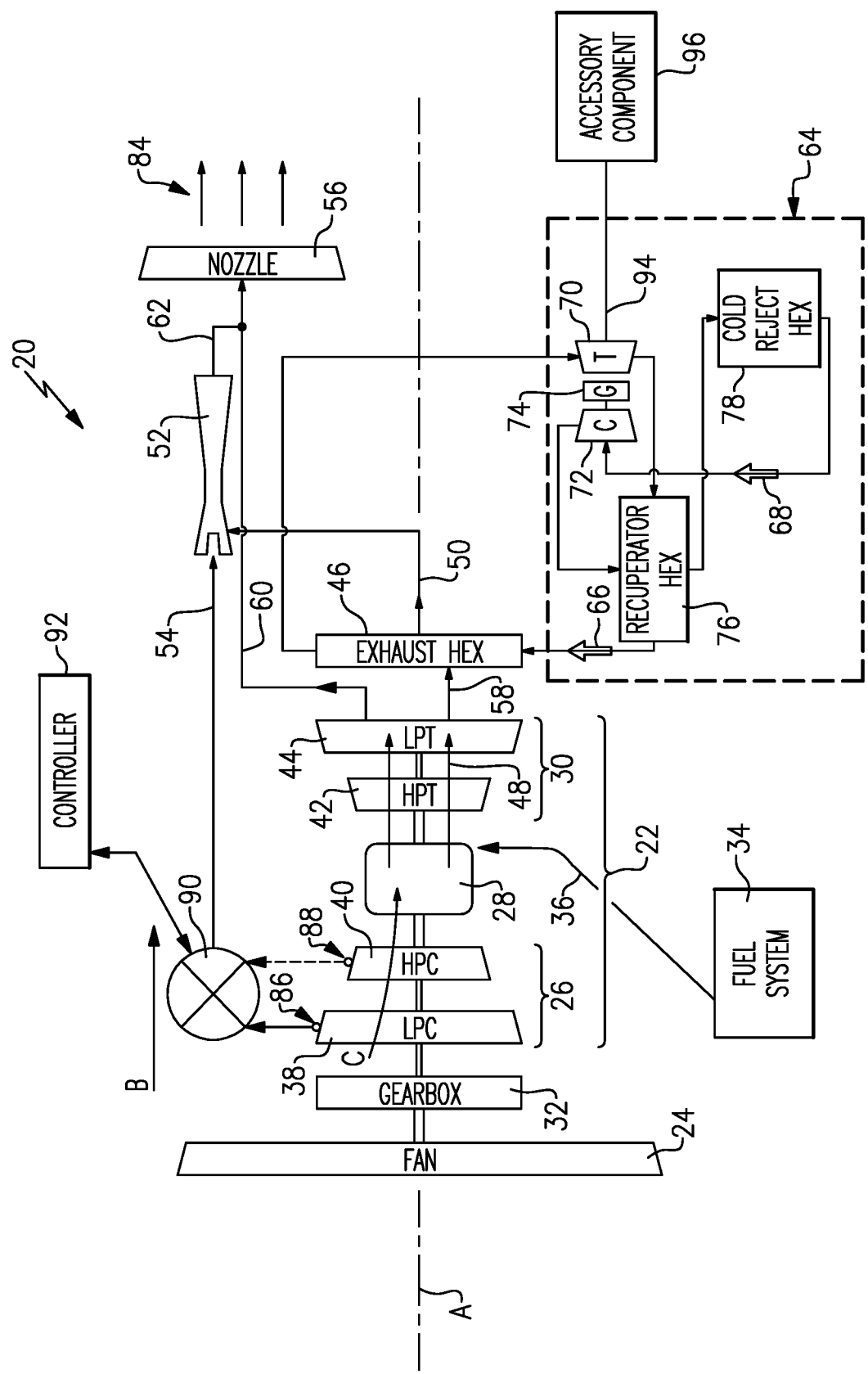
FIG. 1 is a schematic view of an example aircraft propulsion system embodiment.

FIG. 1 schematically illustrates an example propulsion system 20 that includes an ejector placed between a heat exchanger an exhaust nozzle to pressurize exit flow from the heat exchanger to a desired nozzle pressure. Only a portion of exhaust gas flow is communicated through the heat exchanger. The ejector increases the pressure of the exit flow to substantially match exhaust gas flow bypassed around the heat exchanger.

The example propulsion system 20 includes a fan section 24 and a core engine 22. The core engine 22 includes a compressor section 26, a combustor section 28 and the turbine section 30 disposed along an engine longitudinal axis A. The fan section 24 drives inlet airflow along a bypass flow path B, while the compressor section 26 draws air in along a core flow path C. The inlet airflow is compressed and communicated to the combustor section 28 where the compressed core airflow is mixed with a fuel flow 36 and ignited to generate the exhaust gas flow 48. The exhaust gas flow 48 expands through the turbine section 30 where energy is extracted and utilized to drive the fan section 24 and the compressor section 26.

The example core engine 22 includes a low pressure compressor 38 coupled to a low pressure turbine 44 and a high pressure compressor 40 coupled to be driven by a high pressure turbine 42. In one example embodiment, the fan 24 is driven by the low pressure turbine 44 through a gear system 32. The example gear system 32 provides a speed reduction so that both the fan 24 and the low pressure turbine 44 may operate at or near respective optimum speeds.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 34 provides a fuel flow 36 to the combustor 28. The example fuel system 34 may provide a hydrogen based fuel such as a liquid hydrogen ($LH_2$). Although hydrogen is disclosed as one example embodiment, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

The exhaust gas flow 48 is split into a first flow portion 58 that is communicated through a heat exchanger 46 and a second flow portion 60 that is bypassed around the heat exchanger 46 and communicated directly to an exhaust nozzle 56. The heat exchanger 46 provides for the transfer of thermal energy from the first portion of the exhaust gas flow 58 into another fluid flow to recover and utilize thermal energy to improve engine efficiency. In one disclosed example, the heat exchanger 46 heats a first heat transfer medium 66 utilized by a bottoming cycle 64.

Although the bottoming cycle 64 is disclosed by way of example, the heat exchanger 46 may be part of other systems that utilize thermal energy to improve engine efficiency. For example, the heat exchanger 46 may be part of an evaporator or condenser for a water recovery and steam generation system that recovers water from the exhaust gas flow 48 and uses heat to generate steam for injection into the core flow. Moreover, other systems that utilize and recover thermal energy from the exhaust gas flow 48 with a heat exchanger are within the contemplation and scope of this disclosure.

The first flow portion 58 of the exhaust gas flow 48 through the heat exchanger 46 experiences a drop in pressure. An exit flow 50 exiting the heat exchanger 46 is of a lower pressure than the first flow portion 58 and the second flow portion 60. The pressure drop across the heat exchanger 46 removes energy from the exhaust gas flow 48 that is utilized to generate propulsive thrust flow 84 through the nozzle 56. Moreover, the pressure drop through the heat exchanger 46 creates an imbalance in gas flow pressures communicated to the nozzle 56 that reduces overall propulsive efficiency.

In one disclosed example, the first flow portion 58 is less than half that of the second flow portion 60. In another disclosed example, the first flow portion 58 is less than about 25% of the total exhaust gas flow 48. In another example embodiment, the second flow portion is between 10% and 35% of the total exhaust flow 48.

The example system 20 compensates for pressure drops through the heat exchanger 46 by increasing a pressure of the exit flow 50 with an ejector 52. The ejector 52 receives a motive flow 54 from a higher pressure location within the core engine 22 to draw the exit flow 50 from the heat exchanger 46. The exit flow 50 is mixed with the motive flow 54 to generate an increased pressure outlet flow 62 that closely matches the second flow portion 60 that is bypassed around the heat exchanger 46. A single ejector 52 is illustrated by way of example, however, several ejectors 52 may be utilized to tailor operation to different (e.g., application specific) configurations and provide the increased pressures of the outlet flow 62 to the nozzle.

In one example embodiment, the motive flow 54 is drawn from a location 86 within the low pressure compressor 38. In another example embodiment, the motive flow 54 is drawn from a location 88 within the high pressure compressor 40. The motive flow 54 may be drawn from any location along the core flow path C that provides a desired flow and pressure determined to draw in the exit flow 50 and to generate the desired outlet flow 62.

Moreover, an actuator system 90 may be provided to vary the location from which the motive flow 54 is drawn based on current engine operating conditions. For example, the motive flow is taken from the location 86 based on a first operating condition and taken from second location 88 based on a second operation condition. In another disclosed example, the motive flow may be taken from a combination of the first location 86 and the second location 88 based on a third operating condition.

The actuator system 90 may be a single valve or a system of many valves that are operated by the controller 92 to provide the motive flow 54 applicable to current engine operating conditions.

The example controller 92 is a device and system for performing necessary computing or calculation operations of the actuator system 90. The controller 92 may be specially constructed for operation of the actuator system 90, or it may comprise at least a general-purpose computer selectively activated or reconfigured by software instructions stored in a memory device. The controller 92 may further be part of a full authority digital engine control (FADEC) or an electronic engine controller (EEC).

The example heat exchanger 46 transfers thermal energy from the exhaust gas flow 48 to the bottoming cycle 64. The example bottoming cycle 64 includes a first heat transfer medium 66 that accepts heat from the first flow portion 58. The first heat transfer medium 66 is heated and expanded through a turbine 70 that is coupled to drive a compressor 72 through a gearbox 74. The turbine 70 may drive an output shaft 94 to drive an accessory component or device that is schematically indicated at 96. The accessory component 96 may include a pump, generator, actuator, or any other aircraft accessory device.

The example bottoming cycle 64 includes a second heat transfer medium, shown schematically at 68 that is pressurized by the compressor 72 and heated in a recuperation heat exchanger 76 by the first heat transfer medium 66. The second heat transfer medium 68 may be further cooled in a cold sink heat exchanger 78 and recycled through the compressor 72.

Although an example bottoming cycle 64 is shown and described by way of example, other systems that recover thermal energy from the exhaust gas flow 48 could be utilized and are within the contemplation and scope of this disclosure.

Figure 2:
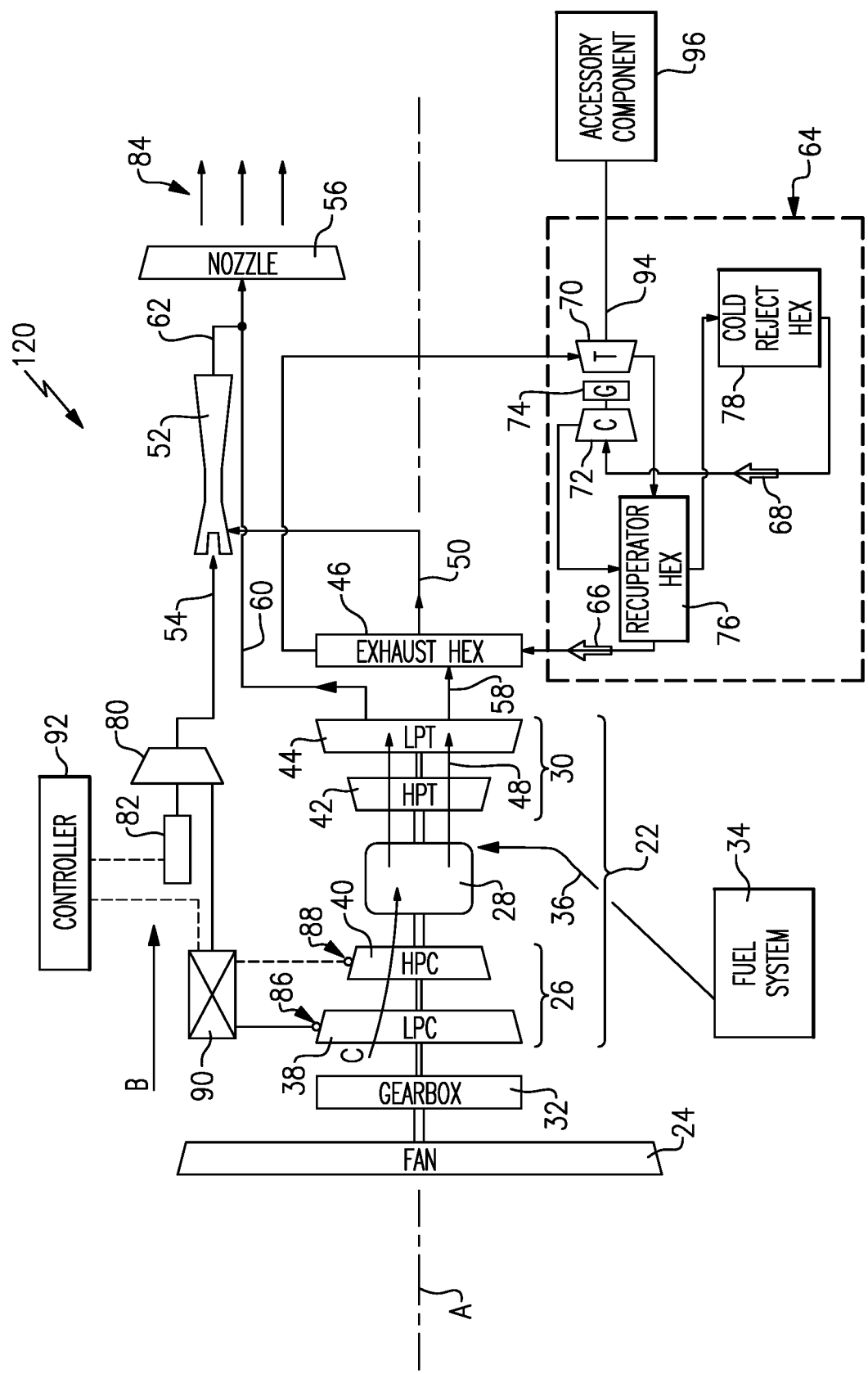
FIG. 2 is a schematic view of another example aircraft propulsion system embodiment.

Referring to FIG. 2, another example propulsion system is schematically shown and generally indicated at 120. The propulsion system 120 includes a booster compressor 80 that is driven by an electric motor 82. The motive flow 54 drawn from the locations 86 and 88 may not provide the pressures required to generate the desired outlet flow 62. Accordingly, the booster compressor 80 is operated to increase pressure of the motive flow 54. The example booster compressor 80 is driven by an electric motor 82 that is controlled by the controller 92. The booster compressor 80 provides for drawing of location within the compressor section 26 that may not be of sufficient pressure, but that have a lesser impact on engine operation. The booster compressor 80 provides for the use of a bleed airflow from other locations within the core flow path C.

Figure 3:
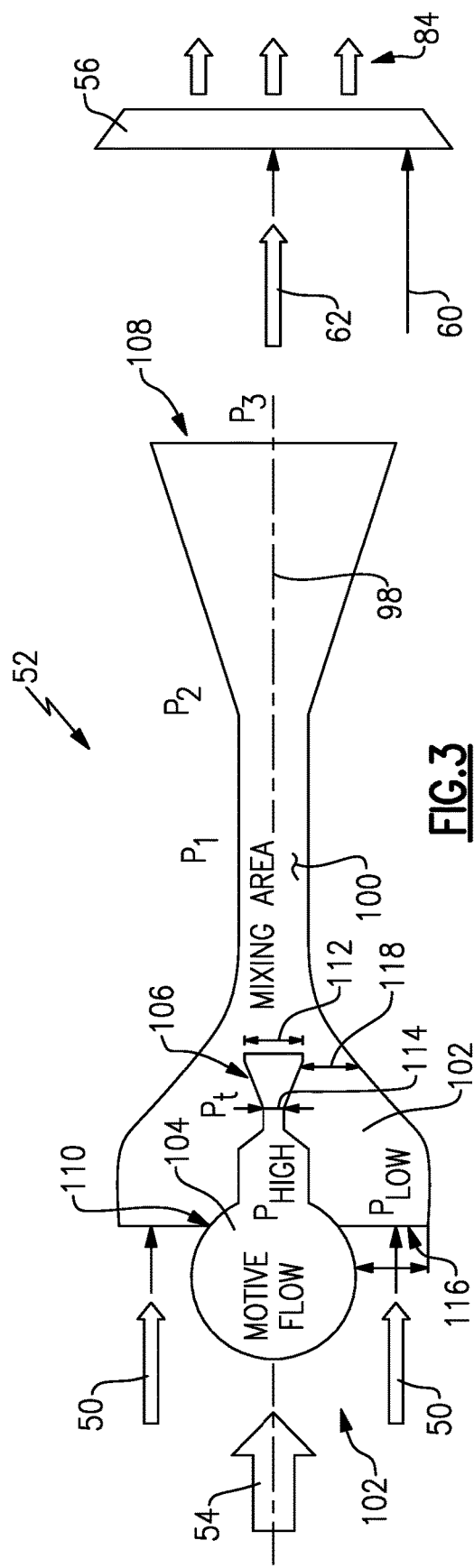
FIG. 3 is a schematic view of an example ejector embodiment.
Figure 4:
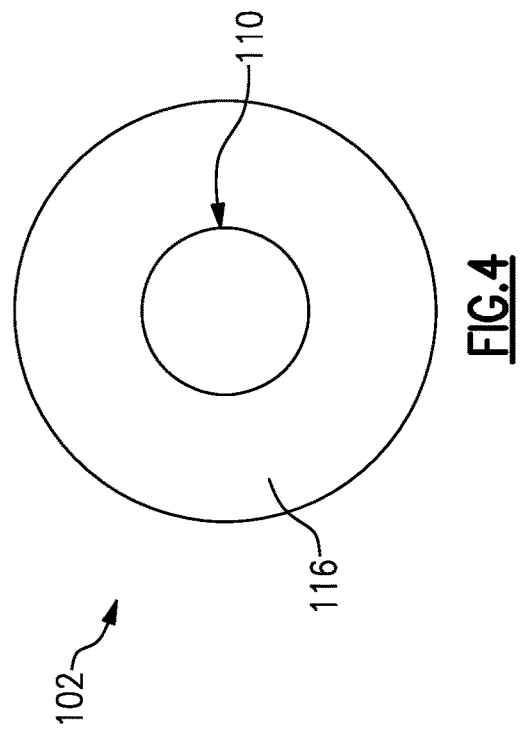
FIG. 4 is a schematic view of an inlet of the example ejector shown in FIG. 3.

Referring to FIGS. 3 and 4 with continued reference to FIGS. 1 and 2, the example ejector 52 is schematically shown and draws in the motive flow 54 along a longitudinal axis 98. The example ejector 52 includes a motive flow nozzle 110 that receives the motive flow 54 and is disposed along the axis 98. The motive flow nozzle 110 includes a nozzle inlet 104 and a converging diverging nozzle 106. The low pressure exit flow 50 enters a low pressure inlet 102 that converges toward a mixing area 100. In the mixing area 100, the motive flow 54 and the exit flow 50 are mixed before being exhausted through a diverging exit opening 108. The higher pressure motive flow 54 creates a suction that draws the exit flow 50 into the mixing area 100.

The motive flow nozzle 110 receives the motive flow 54 at a high pressure (P high). The low pressure inlet 102 receives the lower exit flow 50 at a low pressure (P low). The velocity of the motive flow 54 increases through the flow nozzle 110 and is injected into the mixing area 100. The pressure of the motive flow 54 changes to a throat area pressure (Pt) as velocity of the flow is increased. In the mixing area 100, as the flows intermix and slow, pressure increases from a high velocity low pressure (P1) to a lower velocity higher pressure (P2). The final pressure (P3) of the outlet flow 62 corresponds to the pressure of the second flow 60 that bypassed the heat exchanger 46. The outlet flow 62 and second flow 60 may not be identical, but are within a desired range that provides the desired flow through the nozzle 56 to generate the desired propulsive thrust flow 84.

The example nozzle 106 is configured to accelerate the motive flow 54. In one example embodiment, the nozzle 106 includes a ratio of a throat area 114 to an exit area 112 that is between 0.35 and 0.75.

The low pressure inlet 102 includes an annular inlet area 116 disposed about the motive flow nozzle 110 and an inlet throat area 118 that is disposed around the nozzle 106. In one example embodiment, a ratio of the inlet area 116 to the inlet throat area 118 is between 2.5 and 1.75.

In one example embodiment, an area ratio between the inlet throat area 118 and the nozzle throat area 114 is between 10.0 and 9.0.

Although an example ejector embodiment is illustrated and disclosed by example, other ejector configurations with different area ratios could be utilized and are within the contemplation and scope of this disclosure.

Accordingly, the example propulsion system embodiments accommodate pressure drops generated by heat exchangers within a partial portion of the exhaust gas flow by pressurizing exit flows with an ejector using motive flow drawn from high pressure locations within the core flow path.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aircraft propulsion system comprising:
    a core engine where an inlet flow is communicated along a core flow path and is compressed, mixed with fuel, and ignited to generate an exhaust gas flow that is expanded through a turbine to generate shaft power;
    a heat exchanger in communication with a first portion of the exhaust gas flow, wherein an exit flow is emitted from the heat exchanger, and a second portion of the exhaust gas flow is bypassed around the heat exchanger; and
    an ejector configured to increase a pressure of the exit flow from the heat exchanger with a motive flow taken from the core flow path to generate an emitted flow that matches the second portion of the exhaust gas flow bypassed around the heat exchanger; and
    a nozzle receiving the second portion of the exhaust gas flow bypassed around the heat exchanger and the emitted flow from the ejector.

2. The aircraft propulsion system as recited in claim 1, wherein the motive flow is taken from a compressor section within the core flow path.

3. The aircraft propulsion system as recited in claim 1, wherein a location within the core flow path from which the motive flow is taken varies based on operating conditions.

4. The aircraft propulsion system as recited in claim 1, wherein the motive flow is further pressurized by a booster compressor.

5. The aircraft propulsion system as recited in claim 4, wherein the booster compressor is selectively driven by an electric motor.

6. The aircraft propulsion system as recited in claim 1, further comprising a bottoming cycle that includes a first heat transfer medium in thermal communication with the partial portion of the exhaust gas flow within the heat exchanger.

7. The aircraft propulsion system as recited in claim 6, wherein the bottoming cycle comprises a turbine coupled to a compressor, and wherein the first heat transfer medium expands through the turbine to drive the compressor.

8. The aircraft propulsion system as recited in claim 7, wherein the bottoming cycle includes a recuperator heat exchanger where the first heat transfer medium is in thermal communication with a second heat transfer medium exhausted from the compressor and a cold sink heat exchanger where the second heat transfer medium is cooled by communication with a cold sink.

9. The aircraft propulsion system as recited in claim 1, wherein an area ratio between an inlet throat area and a nozzle throat area of the ejector is between 9.0 and 10.0.

10. The aircraft propulsion system as recited in claim 1, wherein an area ratio between a throat area and an exit area of a motive nozzle of the ejector is between 0.25 and 0.75.

11. An aircraft propulsion system comprising:
a propulsor for generating a propulsive thrust;
a compressor section where an inlet airflow is compressed, the compressor section including a low pressure compressor and a high pressure compressor;
a combustor section where the compressed inlet airflow is mixed with fuel and ignited to generate an exhaust gas flow;
a turbine section through which the exhaust gas flow expands to generate a mechanical power output for driving the propulsor and the compressor section, wherein the turbine section includes a high pressure turbine and a low pressure turbine;
a heat exchanger in communication with a first portion of the exhaust gas flow, wherein an exit flow is emitted from the heat exchanger, and a second portion of the exhaust gas flow is bypassed around the heat exchanger; and
an ejector configured to increase a pressure of the exit flow from the heat exchanger with a motive flow taken from the compressor section to generate an emitted flow that matches a pressure of the second portion of the exhaust gas flow; and
a nozzle receiving both the second portion of the exhaust gas flow and the emitted flow from the ejector.

12. The aircraft propulsion system as recited in claim 11, wherein the motive flow is taken from a first location based on a first operating condition; a second location based on a second operation condition, a combination of the first location and the second location based on a third operating condition.

13. The aircraft propulsion system as recited in claim 12, wherein the motive flow is taken from a combination of the first location and the second location based on a third operating condition.

14. The aircraft propulsion system as recited in claim 11, including an electrically driven booster compressor further pressurizing the motive flow taken from the compressor section.

15. The aircraft propulsion system as recited in claim 11, further comprising a bottoming cycle that includes a first heat transfer medium in thermal communication with the partial portion of the exhaust gas flow within the heat exchanger.

16. The aircraft propulsion system as recited in claim 11, wherein an area ratio between an inlet throat area and a nozzle throat area of the ejector is between 10.0 and 9.0.

17. The aircraft propulsion system as recited in claim 11, including a controller programed to operate a control device to vary the motive flow to the ejector based on engine operating conditions.

18. A method of operating a gas turbine engine comprising:
generating an exhaust gas flow by igniting a mixture of compressed inlet air and fuel;
communicating a first portion of the exhaust gas flow through a heat exchanger for communicating thermal energy into another flow, and bypassing a second portion of the exhaust gas flow around the heat exchanger;
increasing a pressure of an exit flow from the heat exchanger with a motive flow in an ejector to generate an emitted flow that matches a pressure of the second portion of the exhaust gas flow bypassed around the heat exchanger; and
communicating a combined exit flow including both the second portion of the exhaust gas flow and the emitted flow through a common exhaust nozzle.

19. The method as recited in claim 18, further comprising recovering a portion of thermal energy from the exhaust gas flow with a bottoming cycle by transferring thermal energy to a first heat transfer medium within the heat exchanger.

20. The method as recited in claim 18, further comprising tapping the motive flow from a compressor section of the gas turbine engine.

* * * * *